United States Patent
Kim et al.

(10) Patent No.: US 12,454,623 B2
(45) Date of Patent: Oct. 28, 2025

(54) MATTING AGENT-FREE MATTE METALLIC STEEL SHEET FOR HOME APPLIANCE AND REFRIGERATORS INCLUDING THE SAME

(71) Applicant: SAMSUNG ELECTRONICS CO., LTD., Suwon-si (KR)

(72) Inventors: Choongkeon Kim, Suwon-si (KR); Youngdeog Koh, Suwon-si (KR); Kwangjoo Kim, Suwon-si (KR); Yonghwan Kim, Suwon-si (KR); Dahyun Byeon, Suwon-si (KR); Seok Rhee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 140 days.

(21) Appl. No.: 18/243,748

(22) Filed: Sep. 8, 2023

(65) Prior Publication Data
US 2024/0158648 A1   May 16, 2024

Related U.S. Application Data

(63) Continuation of application No. PCT/KR2023/012320, filed on Aug. 21, 2023.

(30) Foreign Application Priority Data

Nov. 11, 2022  (KR) .......... 10-2022-0151060
Jan. 11, 2023  (KR) .......... 10-2023-0004332

(51) Int. Cl.
*C09D 7/61*  (2018.01)
*C09D 5/00*  (2006.01)
(Continued)

(52) U.S. Cl.
CPC .......... *C09D 7/61* (2018.01); *C09D 5/002* (2013.01); *C09D 133/04* (2013.01); *C09D 167/00* (2013.01); *F25D 23/02* (2013.01)

(58) Field of Classification Search
CPC .. F25D 23/02; F25D 2400/18; F25D 2323/02; C09D 7/61; C09D 133/04; C09D 167/00; C09D 5/002
See application file for complete search history.

(56) References Cited

U.S. PATENT DOCUMENTS 7,244,511 B2    7/2007  Choi et al.
2014/0175855 A1  6/2014  Kim
(Continued)

FOREIGN PATENT DOCUMENTS

CN  106091553 A  * 11/2016
CN  111378335 A  *  7/2020  ............ C08L 67/00
(Continued)

OTHER PUBLICATIONS

Translation KR1020220015760A (Year: 2022).*
(Continued)

*Primary Examiner* — Andrew Roersma
(74) *Attorney, Agent, or Firm* — STAAS & HALSEY LLP

(57) ABSTRACT

A matting agent-free matte metallic steel sheet for a home appliance, including a primer layer formed on the steel sheet, a basecoat layer formed on the primer layer, a print layer formed on the basecoat layer, and a clearcoat layer formed on the print layer, wherein the clearcoat layer includes an acrylic resin having a weight average molecular weight Mw range of 70,000 to 100,000.

14 Claims, 12 Drawing Sheets

(51) Int. Cl.
*C09D 133/04* (2006.01)
*C09D 167/00* (2006.01)
*F25D 23/02* (2006.01)

(56) References Cited

U.S. PATENT DOCUMENTS

| | | | |
|---|---|---|---|
| 2015/0141568 A1 | 5/2015 | Yoon | |
| 2019/0056169 A1 | 2/2019 | Hong et al. | |
| 2019/0382613 A1* | 12/2019 | Ito | C09D 175/04 |
| 2021/0301059 A1* | 9/2021 | Furukawa | C09D 4/06 |
| 2023/0167329 A1* | 6/2023 | Lee | C08L 71/00 |
| | | | 428/34.7 |
| 2024/0157396 A1* | 5/2024 | Kim | C09D 7/61 |
| 2024/0165932 A1* | 5/2024 | Kitamura | B32B 15/18 |
| 2024/0352273 A1* | 10/2024 | Wang | C09D 7/70 |

FOREIGN PATENT DOCUMENTS

| | | | | |
|---|---|---|---|---|
| CN | 111454643 A | * | 7/2020 | |
| JP | 10-36761 | | 2/1998 | |
| JP | 2002-20691 | | 1/2002 | |
| JP | 2006-188064 | | 7/2006 | |
| JP | 2009-172917 | | 8/2009 | |
| KR | 1020070099438 A | * | 10/2007 | |
| KR | 20-2013-0004167 | | 7/2013 | |
| KR | 10-1401068 | | 6/2014 | |
| KR | 10-2015-0057090 | | 5/2015 | |
| KR | 10-2015-0073335 | | 7/2015 | |
| KR | 1020190039863 A | * | 4/2019 | |
| KR | 1020190123073 A | * | 10/2019 | |
| KR | 10-2021-0081469 | | 7/2021 | |
| KR | 10-2022-0015760 | | 2/2022 | |
| KR | 10-2022-0039412 | | 3/2022 | |
| KR | 10-2022-0061748 | | 5/2022 | |
| KR | 10-2441799 | | 9/2022 | |
| WO | WO-2014192351 A1 | * | 12/2014 | B32B 27/08 |
| WO | WO-2016199847 A1 | * | 12/2016 | B29C 45/14 |
| WO | WO-2019077930 A1 | * | 4/2019 | B32B 27/00 |
| WO | WO-2021132258 A1 | * | 7/2021 | B05D 1/36 |
| WO | WO-2022074073 A1 | * | 4/2022 | B05D 7/572 |
| WO | WO-2022202172 A1 | * | 9/2022 | |
| WO | WO-2022259739 A1 | * | 12/2022 | C08F 255/023 |
| WO | WO-2024054786 A1 | * | 3/2024 | C09D 5/00 |

OTHER PUBLICATIONS

Translation KR1020220039412A (Year: 2022).*
Translation KR2020130004167U (Year: 2013).*
International Search Report dated Dec. 1, 2023 issued in PCT Application No. PCT/KR2023/012320.
Written Opinion dated Dec. 1, 2023 issued in PCT Application No. PCT/KR2023/012320.

* cited by examiner

MATTING AGENT-FREE MATTE METALLIC STEEL SHEET FOR HOME APPLIANCE AND REFRIGERATORS INCLUDING THE SAME

CROSS-REFERENCE TO RELATED APPLICATION

This application is a continuation application, under 35 U.S.C. § 111 (a), of international application No. PCT/KR2023/012320, filed on Aug. 21, 2023, which claims priority under 35 U. S. C. § 119 to Korean Patent Application No. 10-2022-0151060, filed Nov. 11, 2022 and Korean Patent Application No. 10-2023-0004332, filed Jan. 11, 2023, the disclosures of which are incorporated herein by reference in their entirety.

BACKGROUND

Field

The present disclosure relates to a matting agent-free matte metallic steel sheet for a home appliance and a refrigerator including the same.

Description of the Related Art

In conventional matte metallic steel sheets, a matte texture is realized by inducing diffused reflection of light on a surface thereof by introducing a matting agent including particles into a clear layer. Specifically, a matting agent including particles such as silica, wax, or a filler is added to a clear layer to induce diffused reflection of light to realize a matte texture in conventional matte metallic steel sheets.

However, because light transmission is interrupted by the matting agent including particles in a base layer realizing a color, chroma and metallic brightness deteriorate, thereby deteriorating luxurious quality. Also, the matte metallic steel sheets are vulnerable to surface discoloration due to hygroscopic property of the matting agent and there is problems in the exterior appearance such as deterioration of surface quality and occurrence of scratches because particles of the matting agent protrude.

SUMMARY

In accordance with an embodiment of the present disclosure, a matting agent-free matte metallic steel sheet for a home appliance may include: a steel sheet: a primer layer formed on the steel sheet: a basecoat layer formed on the primer layer: a print layer formed on the basecoat layer; and a clearcoat layer formed on the print layer, wherein the clearcoat layer includes an acrylic resin having a weight average molecular weight (Mw) range of 70,000 to 100,000.

The clearcoat layer may have a thickness range of 2.5 µm to 4.0 µm.

The clearcoat layer may have a solid content (NV) range of 10% to 25%.

The steel sheet may be an electrolytic galvanized iron (EGI) steel sheet or a galvanized iron (GI) steel sheet.

The basecoat layer may comprise an acrylic resin or polyester.

The basecoat layer may comprise a metallic pigment or sparkles.

The basecoat layer may comprise a solvent having a boiling point range of 160° C. to 220° C.

The print layer may be a hairline layer or a pattern layer.

The hairline layer may comprise an acrylic resin having a molecular weight (Mw) range of 70,000 to 90,000.

The primer layer may comprise a black primer having a colorimetric L-value range of 20 to 30.

A brightness reduction rate may be less than or equal to 5%.

In accordance with an embodiment of the present disclosure, a refrigerator may include: a main body: a storage compartment provided in the main body; and a door coupled to the main body to open or close at least one portion of the storage compartment, wherein the door includes a matting agent-free matte metallic steel sheet, and the matting agent-free matte metallic steel sheet includes: a steel sheet: a primer layer formed on the steel sheet: a basecoat layer formed on the primer layer; a print layer formed on the basecoat layer; and a clearcoat layer formed on the print layer, wherein the clearcoat layer includes an acrylic resin having a weight average molecular weight (Mw) range of 70,000 to 100,000.

The clearcoat layer of the matting agent-free matte metallic steel sheet may have a thickness range of 2.5 µm to 4.0 µm.

The clearcoat layer of the matting agent-free matte metallic steel sheet may have a solid content (NV) range of 10% to 25%.

The basecoat layer of the matting agent-free matte metallic steel sheet may comprise an acrylic resin or polyester.

DETAILED DESCRIPTION

Figure 1:
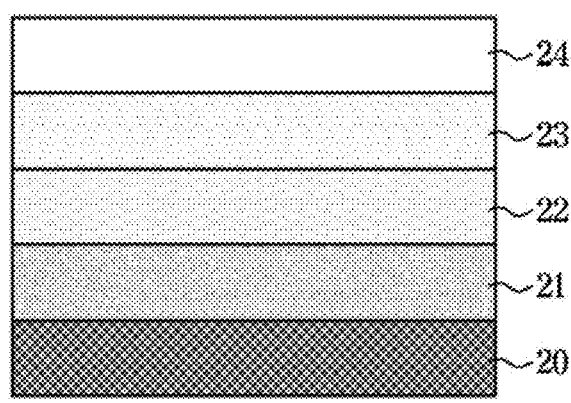
FIG. 1 is a schematic diagram of a matting agent-free matte metallic steel sheet for a home appliance according to an embodiment.

Hereinafter, the present disclosure will be described with reference to the appended drawings. However, various embodiments and terms used herein should not be construed as limited to example embodiments of the present disclosure set forth herein. It should be understood that there is no intent to limit the disclosure to the particular forms disclosed, but on the contrary, the disclosure is to cover all modifications, equivalents, and alternatives falling within the spirit and scope of the disclosure.

Like reference numerals refer to like elements throughout the description of the drawings.

Throughout the specification, the term "comprising" or "including" an element specifies the presence of the stated element, but does not preclude the presence or addition of one or more elements, unless otherwise stated.

An expression used in the singular encompasses the expression of the plural, unless otherwise indicated.

As used herein, the expressions "A or B", "at least one of A and B", "at least one of A or B", "A, B, or C", "at least one of A, B, and C", and "at least one of A, B, or C" may include A alone, B alone, C alone, or any combinations thereof.

The term "and/or" includes a combination of a plurality of associated listed elements or one element among the plurality of associated listed elements.

The terms "first", "second", or the like may be used herein to simply distinguish one element from another and do not limit the elements in another aspect (e.g., importance or order).

It will also be understood that when an element is referred to as being "on" another element, it can be directly on the other element, or intervening elements may also be present therebetween.

When an element is referred to as being "connected to", "coupled to", "supported by", or "in contact with" another element, it may be directly connected to, coupled to, supported by, or in contact with the other element or indirectly connected to, coupled to, supported by, or in contact with the other element via a third element.

Hereinafter, embodiments will be described in detail with reference to the accompanying drawings.

Provided is a matting agent-free matte metallic steel sheet.

Provided is a matte metallic steel sheet having excellent surface characteristics such as reduced surface scratches and surface discoloration with a low brightness reduction rate.

Provided is a refrigerator including a matting agent-free matte metallic steel sheet.

The technical problems to be solved are not limited to the technical problems as described above, and thus other technical problems may be inferred by those of ordinary skill in the art based on the following descriptions.

FIG. 1 is a schematic diagram of a matting agent-free matte metallic steel sheet for a home appliance according to an embodiment.

Referring to FIG. 1, a matting agent-free matte metallic steel sheet 2 for a home appliance according to an embodiment includes: a steel sheet 20; a primer layer 21 formed on the steel sheet 20; a basecoat layer 22 formed on the primer layer 21: a print layer 23 formed on the basecoat layer 22; and a clearcoat layer 24 formed on the print layer 23, wherein the clearcoat layer 24 includes an acrylic resin with a weight average molecular weight Mw of 70,000 to 100, 000.

In the matting agent-free matte metallic steel sheet 2 for a home appliance, the steel sheet 20 may be an electrolytic galvanized iron (EGI) steel sheet or a galvanized iron (GI) steel sheet. However, the embodiment is not limited thereto, and types of the steel sheet may vary according to purposes and functions thereof. For example, the steel sheet 20 may be a stainless steel, a cold-rolled steel sheet, or the like.

The clearcoat layer includes an acrylic resin to obtain chemical resistance, boiling resistance, and processibility, and the acrylic resin may have a weight average molecular weight Mw of 70,000 to 100,000. By developing a coating resin having a mesh structure and a large molecular weight, fine irregularities are formed on a surface by surface shrinkage during drying to induce diffused reflection of light to realize a matte texture. Preferably, the resin may have a weight average molecular weight of 80,000 to 100,000.

Transparency may be increased by using the acrylic resin, and thus improved physical properties such as increased chroma, improved metallic texture, and reduced discoloration may be obtained.

Figure 2:
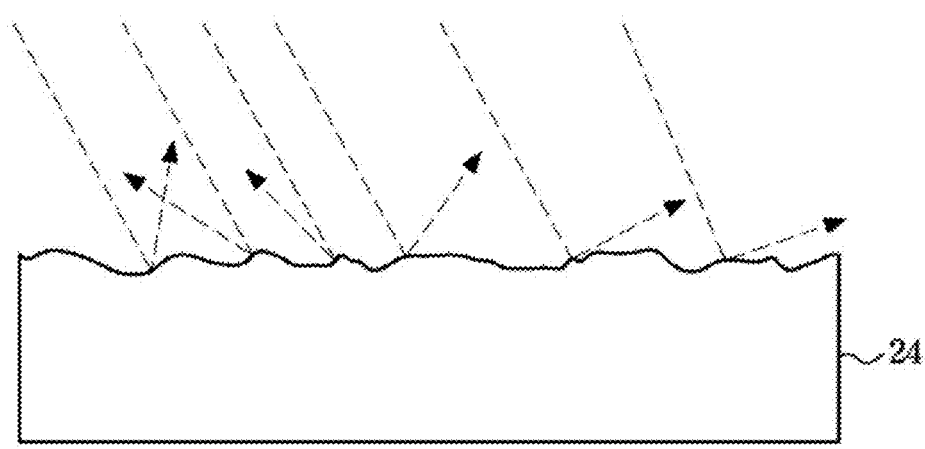
FIG. 2 is a schematic diagram illustrating diffused reflection of light induced in a clearcoat layer of a matting agent-free matte metallic steel sheet for a home appliance according to an embodiment.

FIG. 2 is a schematic diagram of diffused reflection of light induced in a clearcoat layer of a matting agent-free matte metallic steel sheet for a home appliance according to an embodiment.

Referring to FIG. 2, in the matting agent-free matte metallic steel sheet 2 for a home appliance, the clearcoat layer 24 may have a thickness of 2.5 μm to 4.0 μm. The coating is formed as a thin film to maximize formation of fine irregularities on the surface and improve processibility that is a problem of acrylic resins.

In the matting agent-free matte metallic steel sheet 2 for a home appliance, the clearcoat layer 24 may have a solid content (NV) of 10% to 25%.

By adjusting the solid content of the clearcoat layer within a range of 10% to 25%, an increase in the thickness of the coated film is inhibited, and preferably, the solid content of the clearcoat layer may be from 10% to 15%.

The basecoat layer 22 may be provided on the steel sheet 20 to realize various colors or improve metallic texture, thereby improving an exterior appearance.

The basecoat layer 22 may include an acrylic resin.

In general, plastics may be classified into crystalline resins and amorphous resins according to molecular structures thereof. The amorphous resins having irregular molecular structures are transparent because there is no region for scattering. On the contrary, the crystalline resins having regular molecular structures are opaque because scattering occurs between a crystalline region and an amorphous region.

Examples of the crystalline resins may include polyamide (PA), polyester (PE), acetal-POM, polypropylene (PP), and polycarbonate (PC). Examples of the amorphous resins may include polycarbonate (PC), PVC, ABS, polystyrene (PS), polyvinyl chloride, and acrylic resin. However, the embodiment is not limited thereto, and different types of amorphous resins may also be used to increase transparency of the steel sheet coating layer.

The basecoat layer 22 may include a metallic pigment.

The metallic pigment is a pigment shining by partially reflecting light. Therefore, the basecoat layer 22 may have improved metallic texture and increased brightness by including the metallic pigment.

The metallic pigment may be in the form of elliptical particles with long major axes. Preferably, the metallic pigment may have a major axis of 12 μm to 18, more preferably, 16 μm to 18 μm.

Figure 3:
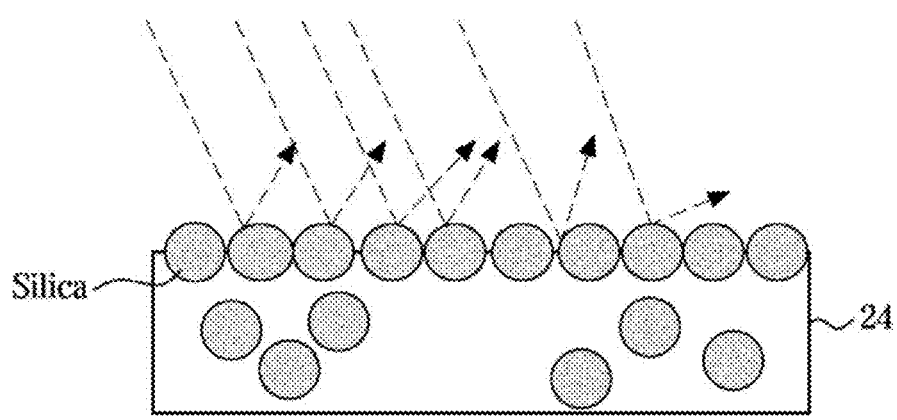
FIG. 3 is a schematic diagram illustrating diffused reflection of light induced in a clearcoat layer of a conventional matting agent-containing matte metallic steel sheet.

FIG. 3 is a schematic diagram illustrating diffused reflection of light induced in a clearcoat layer of a conventional matting agent-containing matte metallic steel sheet.

Figure 4:
FIG. 4 is a photograph showing surface stripes formed on a surface of a conventional matting agent-containing matte metallic steel sheet.
Figure 5:
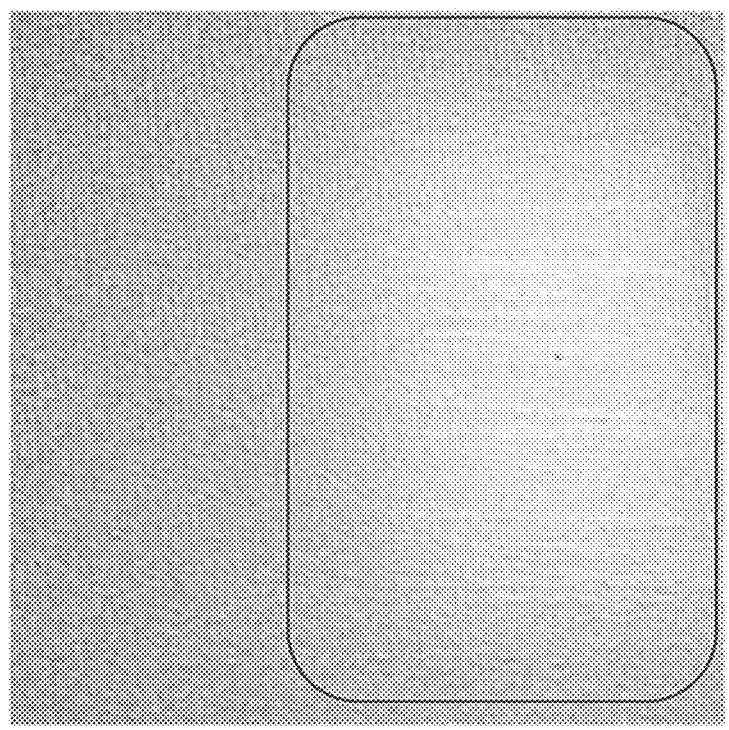
FIG. 5 is a photograph showing surface scratches on a surface of a conventional matting agent-containing matte metallic steel sheet.
Figure 6:
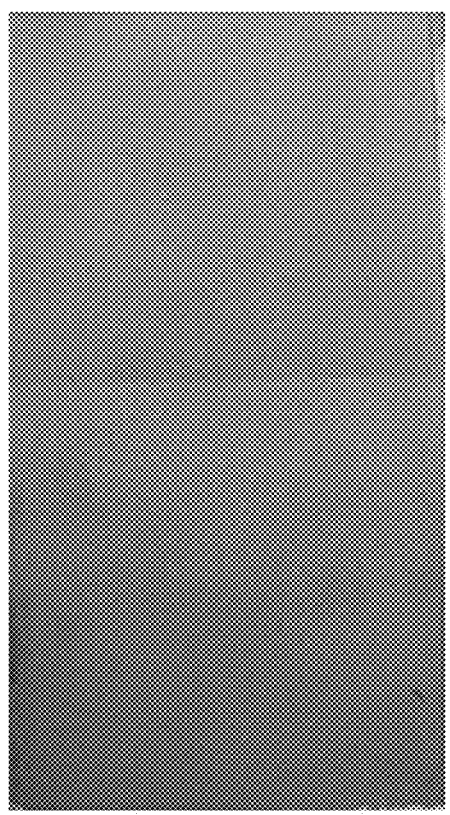
FIG. 6 is a photograph showing surface discoloration of a matting agent-free matte metallic steel sheet for a home appliance according to an embodiment and a conventional matting agent-containing matte metallic steel sheet which are vertically arranged.

Referring to FIG. 3, in conventional matte metallic steel sheets, a matte texture is realized by inducing diffused reflection of light on surfaces thereof by introducing a matting agent including particles such as silica, wax, and a filler into a clearcoat layer. However, in this case, as shown in FIGS. 4 to 6, it is difficult to apply the matte metallic steel sheets to luxurious products because brightness decreases due to the particles of the matting agent interrupting transmission and reflection of light in a basecoat layer configured to realize a color, and the matte metallic steel sheets have inferior surface characteristics because particles of the matting agent protrude causing surface scrapes and surface scratches and have inferior chemical resistance and boiling resistance due to hygroscopic property of the matting agent.

Figure 7:
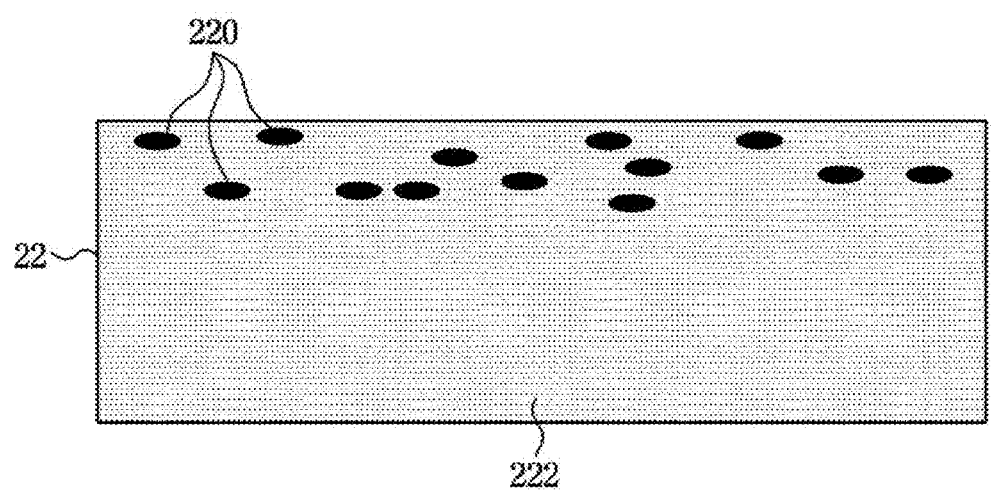
FIGS. 7 and 8 are schematic diagrams illustrating a change in brightness according to lengths of major axes of metallic pigments.
Figure 8:
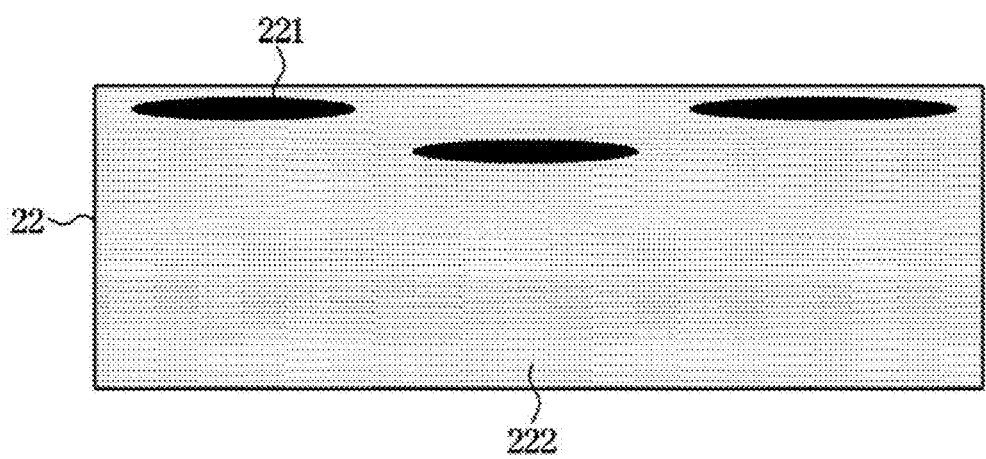

FIGS. 7 and 8 are schematic diagrams illustrating a change in brightness according to lengths of major axes of metallic pigments.

Brightness of a surface of a steel sheet may vary according to a specular reflection rate of light. For example, as the specular reflection rate of light increases on the surface of the steel sheet, brightness increases.

Referring to FIGS. 7 and 8, in the case where the basecoat layer 22 includes a metallic pigment 220 with a short major axis, the specular reflection rate of light decreases. Therefore, brightness may decrease in the case where in the basecoat layer 22 includes the metallic pigment 220 with a short major axis. However, in the case where the basecoat layer 22 includes a metallic pigment 221 with a long major axis, the specular reflection rate of light increases. Therefore, brightness may increase in the case where the basecoat layer 22 includes the metallic pigment 221 with a long major axis. However, a too long major axis of the metallic pigment may cause deterioration of surface roughness due to protrusions formed on the surface of the steel sheet. As a result, scratches may occur while a coating roll passes over the surface during a subsequent coating process. That is, a too long major axis of the metallic pigment may cause deterioration in surface quality of the steel sheet. Therefore, the major axis of the metallic pigment may be 18 μm or less in the present disclosure.

The basecoat layer 22 may include a solvent with a boiling point of 160° C. to 220° C. Preferably, a solvent with a boiling point of 170° C. to 210° C. may be used.

The metallic pigment is not dissolved in a solvent but dispersed therein. In response to application of a paint for the basecoat layer on the primer layer 21, the metallic pigment slowly floats on the basecoat layer 22 and the solvent evaporates. Therefore, in accordance with an evaporation rate, distribution of the metallic pigment in the basecoat layer 22 may vary.

Figure 9:
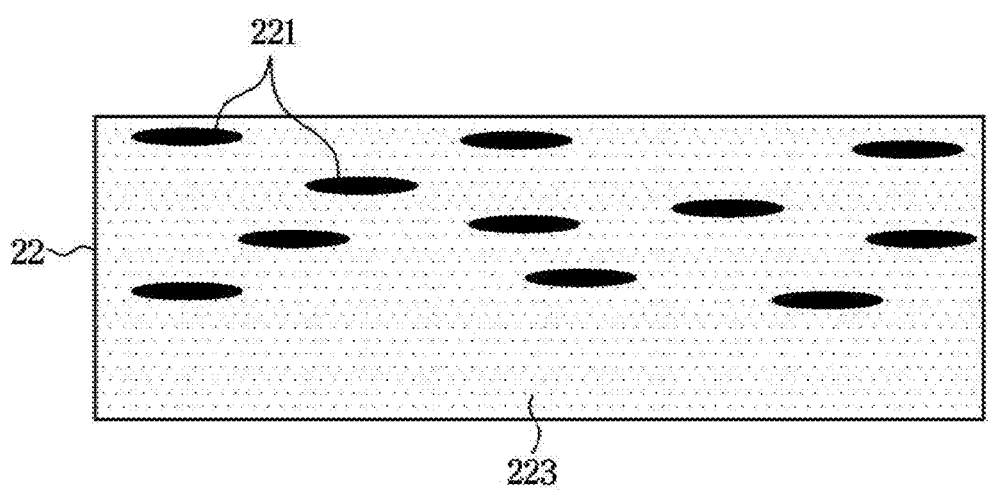
FIGS. 9 and 10 are schematic diagrams illustrating a change in brightness according to boiling points of solvents of a basecoat layer.
Figure 10:
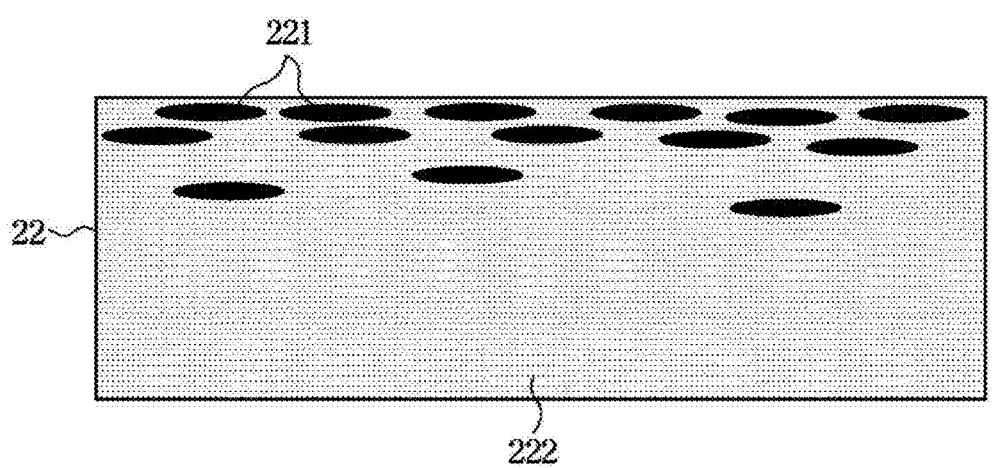

FIGS. 9 and 10 are schematic diagrams illustrating a change in brightness according to boiling points of solvents of a basecoat layer.

Referring to FIGS. 9 and 10, in a basecoat layer 22 including a solvent 223 having a low boiling point, the solvent 223 completely evaporates in a state where the metallic pigment 221 does not sufficiently float on the basecoat layer 22. Therefore, a low boiling point of the solvent may cause a decrease in the specular reflection rate of light by the metallic pigment 221, resulting in a decreases in brightness. However, in a basecoat layer 22 including a solvent 222 having a high boiling point, the solvent 222 evaporates after the metallic pigment 221 sufficiently floats on the basecoat layer 22. Therefore, a high boiling point of the solvent causes an increase in the specular reflection rate, resulting in an increase in brightness. However, a too high boiling point of the solvent may cause a decrease in the specular reflection rate because the solvent contained inside cannot evaporate but remains therein after the surface of the basecoat layer 22 is cured. Therefore, in the present disclosure, a solvent with a boiling point of 160° C. to 220° C. may be used, preferably, a solvent with a boiling point of 170° C. to 210° C. may be used.

In the matting agent-free matte metallic steel sheet 2 for a home appliance, the print layer 23 may be a hairline layer or a pattern layer.

The hairline layer may include an acrylic resin having a weight average molecular weight (Mw) of 70,000 to 90,000.

High brightness may be realized by increasing transparency by forming the hairline layer using an acrylic resin, and due to high binding strength of the acrylic resin, the matting agent-free matte metallic steel sheet 2 for a home appliance according to an embodiment may have improved chemical resistance and boiling resistance.

Due to high binding strength, the acrylic resin may have low processability. Particularly, an acrylic resin having a low molecular weight may have far lower processibility because chains in a molecular structure are short in length. Therefore, in the present disclosure, processibility is improved by using an acrylic resin having a large molecular weight. That is, by using an acrylic resin with a high molecular weight of 70,000 to 90,000, excellent processability may be obtained simultaneous improving chemical resistance and boiling resistance.

The clearcoat layer 24 may be provided on the outermost side of the matting agent-free matte metallic steel sheet 2 for a home appliance to protect the exterior appearance.

The primer layer 21 may be disposed between the steel sheet 20 and the basecoat layer 22 to provide adhesion between the steel sheet 20 and the basecoat layer 22 and enhance corrosion resistance.

The primer layer 21 may include a black primer having a colorimetric L-value of 20 to 30.

Although silica and $TiO_2$ components used in primers are white in color, the primer layer 21 of the matting agent-free matte metallic steel sheet 2 for a home appliance according to an embodiment may be formed of a black primer, and accordingly, high brightness may be realized by luminosity contrast by forming a coating layer with a bright color on the black primer layer 21. However, in the case where the colorimetric L-value of the black primer is too low, contents of a resin and a rust preventing additive in the primer decrease, and thus corrosion resistance may deteriorate. Therefore, in the present disclosure, a black primer having a colorimetric L-value of 20 to 30 may be used.

The matting agent-free matte metallic steel sheet 2 for a home appliance may have a brightness reduction rate of 5% or less. In the conventional matte metallic steel sheet, a matte texture is realized by inducing diffusion reflection of light on surfaces thereof by introducing a matting agent including particles such as silica, wax, and a filler into a clearcoat layer. In this case, as shown in FIGS. 4 to 6, transmission and reflection of light are interrupted in the base layer configured to realize a color due to the particles of the matting agent, so that brightness deteriorates. However, according to the present disclosure, the clearcoat layer 24 includes an acrylic resin having a weight average molecular weight Mw of 70,000 to 100,000 and has a thickness of 2.5 μm to 3.9 μm, a matting agent-free matte metallic steel sheet having a brightness reduction rate of 5% or less may be provided.

Hereinafter, a refrigerator according to another embodiment of the present disclosure will be described.

A refrigerator according to an embodiment may include a main body.

The "main body" may include inner cabinets, outer cabinets coupled to outer sides of the inner cabinets, and an insulation material disposed between the inner cabinets and the outer cabinets.

The "inner cabinet" may include at least one of a case, plate, panel, or liner forming a storage compartment. The inner cabinet may be formed as a single body or an assembly of a plurality of plates. The "outer cabinet" may define an exterior appearance of the main body and may be coupled to the outer side of the inner cabinet such that the insulation material is disposed between the inner cabinet and the outer cabinet.

The "insulation material" may insulate the inside of the storage compartment from the outside of the storage compartment such that the inside of the storage compartment is maintained at a preset appropriate temperature without being affected by an external environment. According to an embodiment, the insulation material may include a foam insulation material. The foam insulation material may be molded by injecting and blowing a mixture of polyurethane and a foaming agent into a gap between the inner cabinet and the outer cabinet.

According to an embodiment, the insulation material may further include a vacuum insulation material in addition to the foam insulation material, or may be formed of only the vacuum insulation material instead of the foam insulation material. The vacuum insulation material may include a core material and a shell material accommodating the core material and sealing the inside in a vacuum or a pressure similar to vacuum. However, the insulation material is not limited to the above-described foam insulation material or vacuum insulation material, and various material available for insulation may also be included therein.

The "storage compartment" may include a space defined by the inner cabinets. The storage compartment may further include inner cabinets defining a space corresponding to the storage compartment. In the storage compartment, various items such as foods, medicines, and cosmetics may be stored, and at least one side may be open to deposit or withdraw the items.

The refrigerator may include one or more storage compartments. In the case where the refrigerator includes two or more storage compartments, the respective storage compartments may have different purposes and may be maintained at different temperatures. To this end, the storage compartments may be partitioned by barrier walls including the insulation material.

The storage compartment may be maintained in an appropriate temperature range according uses and may include a "refrigerator compartment", a "freezer compartment", or a "temperature-variable compartment" distinguished according to the uses and temperature ranges. The refrigerator compartment may be maintained at a temperature suitable for storing items in a refrigerated state, and the freezer compartment may be maintained at a temperature suitable for storing items in a frozen state. The term "refrigeration" may refer to cooling of an item to the extent that the item is not frozen, and for example, the refrigerator compartment may be maintained in a temperature range of 0° Celsius to 7° Celsius. The term "freezing" may refer to freezing an item or keeping an item in a frozen state, and for example, the freezer compartment may be maintained in a temperature range of −20° Celsius to −1° Celsius. The temperature-variable compartment may be used as either a refrigerator compartment or a freezer compartment according to or regardless of a user's choice.

The storage compartment may also be referred to as various names such as "vegetable compartment", "fresh compartment", "cooling compartment" and "ice-making compartment" in addition to the "refrigerator compartment", "freezer compartment" and "temperature-variable compartment". The terms "refrigerator compartment", "freezer compartment" and "temperature-variable compartment", and the like used hereinafter should be understood as a concept encompassing storage compartments having uses and temperature ranges corresponding thereto, respectively.

According to an embodiment, the refrigerator may include at least one door configured to open and close one open side of the storage compartment. The door may be provided to open and close each of one or more storage compartments, or one door may be provided to open and close a plurality of storage compartments. The door may be rotatably or slidably installed on the front of the main body.

The "door" may be configured to close the storage compartment when the door is closed. Like the main body, the door may include an insulation material to insulate the storage compartment when the door is closed.

According to an embodiment, the door may include a door outer panel defining a front surface of the door, a door inner panel defining a rear surface of the door and facing the storage compartment, an upper cap, a lower cap, and a door insulation material provided therein.

A gasket may be mounted along boundaries of the door inner panel to be in close contact with the front surface of the main body when the door is closed, thereby sealing the storage compartment. The door inner panel may include a dyke protruding backward such that door baskets for storing items are mounted thereon.

According to an embodiment, the door may include a door body and a front panel detachably coupled to the front of the door body and defining a front surface of the door. The door body may include a door outer panel defining the front surface of the door body, a door inner panel defining a rear surface of the door body and facing the storage compartment, an upper cap, a lower cap, and a door insulation material provided therein.

Refrigerators may be classified into French door type refrigerators, side-by-side type refrigerators, bottom mounted freezer (BMF) type refrigerators, top mounted freezer (TMF) type refrigerators, or 1-door refrigerators according to arrangement of doors and storage compartments.

According to an embodiment, the refrigerator may include a cold air supply device provided to supply cold air to the storage compartments.

The "cold air supply device" may include a machine, appliance, electronic device, and/or a system including a combination thereof capable of cooling the storage compartment by generating and guiding cold air.

According to an embodiment, the cold air supply device may generate cold air by using a refrigeration cycle including processes of compression, condensation, expansion, and evaporation. To this end, the cold air supply device may include a refrigeration cycle device composed of a compressor, a condenser, an expansion valve, and an evaporator capable of driving the refrigeration cycle. According to an embodiment, the cold air supply device may include a semiconductor such as a thermoelectric element. The thermoelectric element may cool the storage compartment by heating and cooling operations by the Peltier effect.

According to an embodiment, the refrigerator may include a machine room in which at least some components of the cold air supply device are arranged.

The "machine room" may be provided to be partitioned and insulated from the storage compartment to prevent heat generated by the components located in the machine room from being transferred to the storage compartment. The inside of the machine room may be configured to communicate with the outside of the main body to dissipate heat from the components located in the machine room.

According to an embodiment, the refrigerator may include a dispenser to provide water and/or ice. The dispenser may be provided at the door allowing a user's approach without opening the door.

According to an embodiment, the refrigerator may include an ice maker configured to make ice. The ice maker may include an ice making tray to store water, an ice separating device configured to separating ice from the ice making tray, and an ice bucket to store the ice made in the ice making tray.

According to an embodiment, the refrigerator may include a controller configured to control the refrigerator.

The "controller" may include a memory configured to store programs and/or data to control the refrigerator, and a processor configured to output a control signal to control the cold air supply device and the like in accordance with the programs and/or data stored in the memory.

The memory stores or records various information, data, commands, programs, and the like required for operations of the refrigerator. The memory may store temporary data generated while a control signal to control the components of the refrigerator are generated. The memory may include at least one of a volatile memory or a non-volatile memory or a combination thereof.

The processor controls the overall operation of the refrigerator. The processor may control the components of the refrigerator by executing programs stored in the memory. The processor may include a separate neural processing unit (NPU) configured to perform the operation of artificial intelligence models. Also, the processor may include a central processing unit (CPU), a graphics processing unit (GPU), and the like. The processor may generate a control signal to control the operation of the cold air supply device. For example, the processor may receive temperature information of the storage compartment from a temperature sensor and generate a refrigeration control signal to control the operation of the cold air supply device based on the temperature information of the storage compartment.

In addition, the processor may process a user input of a user interface in accordance with programs and/or data stored in the memory and may control the operation of the user interface. The user interface may be provided by using an input interface and an output interface. The processor may receive a user input from the user interface. In addition, the processor may transfer, to the user interface, display control signals and image data used to display an image on the user interface in response to the user input.

The processor and the memory may be provided integrally or separately. The processor may include at least one processor. For example, the processor may include a main processor and at least one sub-processor. The memory may include at least one memory.

According to an embodiment, the refrigerator may include a processor and a memory configured to control all of the components included in the refrigerator and may also include a plurality of processors and a plurality of memories configured to individually control each of the components of the refrigerator. For example, the refrigerator may include a processor and a memory configured to control the operation of the cold air supply device according to an output of the temperature sensor. In addition, the refrigerator may include processors and memories respectively configured to control the operation of the user interface in accordance with the user input.

A communication module may communicate with external devices such as a mobile device and other home appliances via an access point (AP) nearby. The access point (AP) may connect a local area network (LAN) connected to a refrigerator or a user device with a wide area network (WAN) connected to a server. The refrigerator or user device may be connected to the server via the wide area network (WAN).

The input interface may include a key, a touchscreen, and a microphone. The input interface may receive a user input and transmit the received user input to the processor.

The output interface may include a display, a speaker, and the like. The output interface may output various notifications, messages, and information generated by the processor.

Hereinafter, a refrigerator according to various embodiments will be described in detail with reference to the accompanying drawings.

Figure 11:
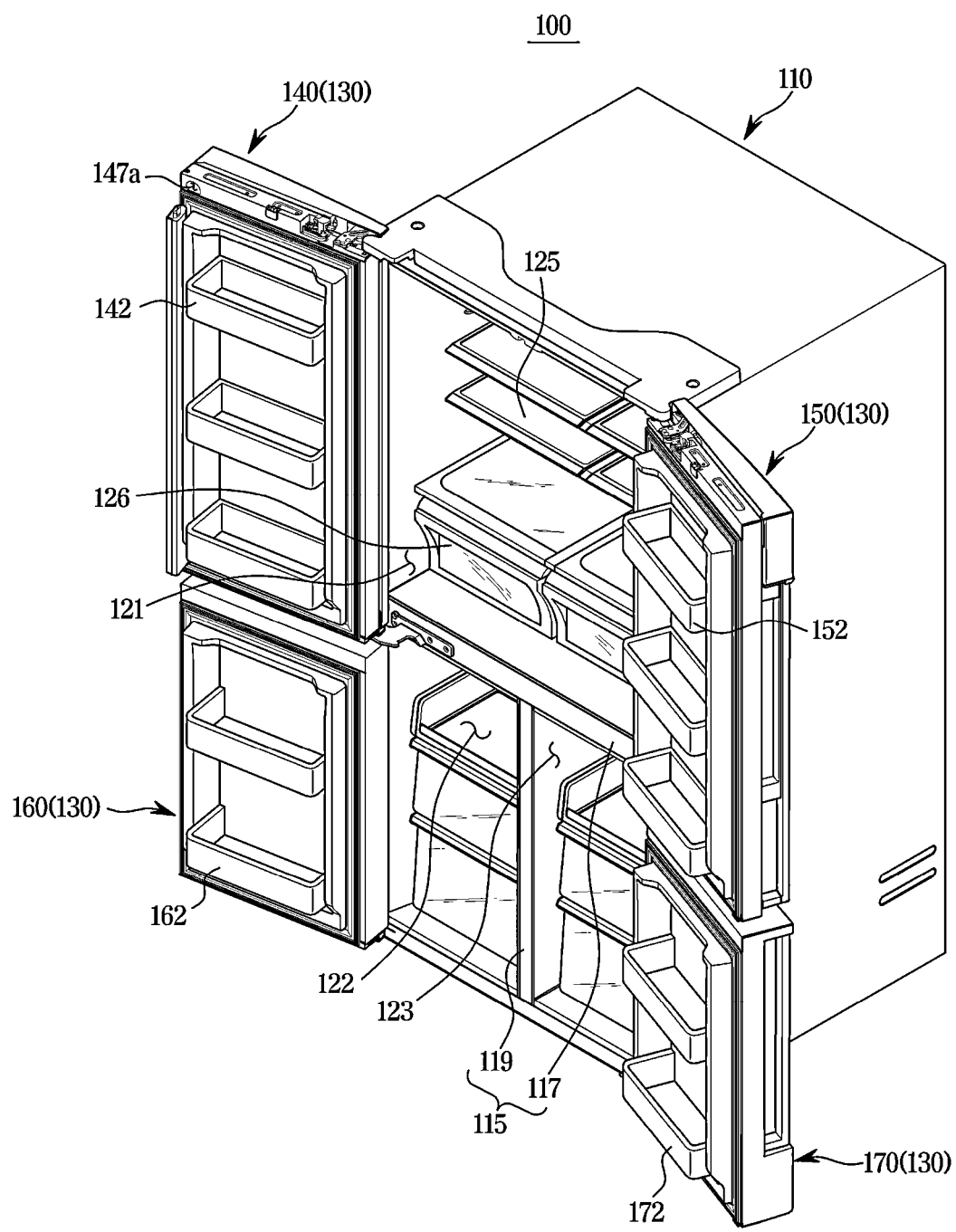
FIG. 11 is a schematic diagram of a refrigerator according to an embodiment.

FIG. 11 is a schematic diagram of a refrigerator according to an embodiment.

A refrigerator 100 according to the present disclosure may include a main body 110, a storage compartment provided inside the main body 110, and a door 130 coupled to the main body 110 to open and close at least one portion of the storage compartment. The door 130 may include a matting agent-free matte metallic steel sheet 2 for a home appliance. (See FIG. 12)

The matting agent-free matte metallic steel sheet 2 for a home appliance may include: a steel sheet 20; a primer layer 21 formed on the steel sheet 20; a basecoat layer 22 formed on the primer layer 21: a print layer 23 formed on the basecoat layer 22; and a clearcoat layer 24 formed on the print layer 23, wherein the clearcoat layer 24 includes an acrylic resin with a weight average molecular weight Mw of 70,000 to 100,000.

The matting agent-free matte metallic steel sheet 2 for a home appliance is as described above.

Referring to FIG. 11, the refrigerator 100 according to an embodiment may include the main body 110, and storage compartments 121, 122, and 123 provided in the main body 110 to be vertically partitioned. The refrigerator 110 may include the door 130 to open and close the storage compartments 121, 122, and 123, and a cold air supply device (not shown) configured to supply cold air to the storage compartments 121, 122, and 123.

The door 130 may include the matting agent-free matte metallic steel sheet 2 for a home appliance.

The main body 110 may include inner cabinets defining the storage compartments 121, 122, and 123, outer cabinets coupled to outer sides of the inner cabinets to define an exterior appearance, and an insulation material foamed between the inner cabinets and the outer cabinets to insulate the storage compartments 121, 122, and 123.

The storage compartments 121, 122, and 123 may be divided into a plurality of sections by a partition 115, and a plurality of shelves 125 and storage containers 126 may be provided in the storage compartments 121, 122, and 123 to store food, and the like.

The storage compartments 121, 122, and 123 may be divided into a plurality of storage compartments 121, 122, and 123 by the partition 115, and the partition 115 may include a first partition 117 arranged in a horizontal direction to divide the storage compartments 121, 122, and 123 into a first storage compartment 121 and second storage compartments 122 and 123, and a second partition 119 coupled to the second storage compartments 122 and 123 in the longitudinal direction to divide the second storage compartments 122 and 123 into a first lower storage compartment 122 and a second lower storage compartment 123.

The partition 115 having a T-shape in which the first partition 117 is coupled to the second partition 119 may divide the storage compartments 121, 122, and 123 into three spaces. Among the first storage compartment 121 and the second storage compartments 122 and 123 divided by the first partition 117, the first storage compartment 121 may be used as a refrigeration compartment, and the second storage compartments 122 and 123 may be used as freezer compartments.

The division of the storage compartments 121, 122, and 123 as described above is an example and each of the storage compartments 121, 122, and 123 may be used in any manner different from the above-described configuration.

The first storage compartment 121 and the second storage compartments 122 and 123 may be opened and closed respectively by the doors 130 pivotally coupled to the main body 110.

The door 130 may include a pair of first storage compartment doors 140 and 150 pivotally coupled to the main body 110 to open and close the first storage compartment 121, and a pair of second storage compartment doors 160 and 170 pivotally coupled to the main body 110 to open and close the second storage compartments 122 and 123.

At least one of the pair of first storage compartment doors 140 and 150 may be provided with a rotating bar covering a gap between the pair of first storage compartment doors 140 and 150 when the pair of first storage compartment doors 140 and 150 are closed. The rotating bar may be rotatably coupled to at least one of the pair of first storage compartment doors 140 and 150. The rotating bar may be guided to rotate in accordance with opening/closing of one of the first storage compartment doors 140 and 150 to which the rotating bar is coupled by a rotating guide formed at the inner cabinet.

Rear surfaces of the pair of first storage compartment doors 140 and 150 may be provided with door shelves 142 and 152 for food storage, respectively. Rear surfaces of the pair of second storage compartment doors 160 and 170 may be provided with door shelves 162 and 172 for food storage, respectively.

Meanwhile, a blower fan may be installed at one or more of the pair of first storage compartment doors 140 and 150 to prevent dew formation on side surfaces constituting a gap between the pair of first storage compartment doors 140 and 150 when the pair of first storage compartment doors 140 and 150 are closed. An inlet 147a may be provided at an upper portion of at least one of the pair of first storage compartment doors 140 and 150 to introduce air into the blower fan. An outlet may be provided at a side surface to blow air into the gap between the pair of first storage compartment doors 140 and 150.

The pair of first storage compartment doors 140 and 150 may include a first door 140 and a second door 150 provided at one side of the first door 140. However, the embodiment is not limited thereto, and the first door and the second door may be provided as a first door 160 of the pair of second storage compartment doors 160 and 170 and a second door 170 provided at one side of the first door 160.

The embodiment is not limited to the door structure mounted with a fan case accommodating the blower fan or a guide duct as shown in FIG. 11 and the refrigerator may include a plurality of doors arranged sequentially.

Hereinafter, the present disclosure will be described in more detail with reference to the following examples and comparative examples. However, the following examples are merely presented to exemplify the present disclosure, and the scope and effects of the present disclosure is not limited thereto.

Examples

To realize a matting agent-free matte metallic steel sheet for a home appliance, a color pre-coated metal (PCM) was prepared by forming a primer layer, a basecoat layer, and a print layer on an EGI steel sheet by using a roll coating method, and then a clearcoat layer including each of the resins shown in Table 1 below was coated on the print layer and dried. In this regard, a thickness of the coated film was measured by using a destructive method using a DJH-FTS device.

TABLE 1

|  | Example 1 | Comparative Example 1 | Comparative Example 2 | Comparative Example 3 | Comparative Example 4 | Comparative Example 5 | Comparative Example 6 |
|---|---|---|---|---|---|---|---|
| Resin TYPE | acrylic resin | acrylic resin | acrylic resin | polyester resin | polyester resin | polyester resin | polyester resin |
| Molecular weight (Mw) | 70,000~100,000 | 70,000~100,000 | 30,000~50,000 | 10,000~30,000 | 30,000~50,000 | 30,000~50,000 | 10,000~30,000 |
| Thickness of film (μm) | 2.5~4.0 | 5.0~7.0 | 2.5~4.0 | 2.5~4.0 | 5.0~7.0 | 2.5~4.0 | 8.0~12.0 |
| Solid content (NV, %) | 10~25% | 10~25% | 50~60% | 40~50% | 30~40% | 30~40% | 40~50% |
| Matting agent | — | — | — | — | — | — | silica |

<Evaluation of Brightness and Gloss>

Brightness and gloss of samples of the examples and comparative examples shown in Table 2 were measured and shown.

Gloss that is an optical property showing a degree of specular reflection of a surface was measured by using a gloss meter (BYK). After measuring gloss of a sample on a flat place using the gloss meter 5 times, an average of 60° measurement values was obtained. Brightness was measured at room temperature using an X-Rite MA68± and digitized by flop index using light reflectance of a metallic pigment at different angles. Reflectance of the metallic pigment was measured at angles 15°, 45°, and 115°.

Brightness expressed as a numerical value of flop index has no unit.

TABLE 2

|  | Example 1 | Comparative Example 1 | Comparative Example 2 | Comparative Example 3 | Comparative Example 4 | Comparative Example 5 | Comparative Example 6 |
| --- | --- | --- | --- | --- | --- | --- | --- |
| Gloss | 72~75 | 102~106 | 105~110 | 93~97 | 94~98 | 89~93 | 72~75 |
| Brightness | 23.23 | 23.39 | 23.43 | 19.82 | 20.02 | 19.30 | 17.21 |

Because the clearcoat layer of Example 1 included an acrylic resin having a weight average molecular weight of 70,000 to 100,000, was formed as a thin film having a thickness of 2.5 μm to 4.0 μm, and had a solid content of 10% to 25%, a matte metallic steel sheet having a brightness reduction rate of 5% or less was able to be provided although a matting agent was not used. On the contrary, it was confirmed that in Comparative Examples 1 to 6, a brightness reduction rate exceeds 5% because the resin type, weight average molecular weight, and the thickness of the coated film did not satisfy the conditions provided herein.

<Evaluation of Physical Property>

Surface discoloration and processability of the examples and comparative examples were evaluated and the results are shown in Table 3 below.

Surface discoloration was evaluated by measuring chemical resistance, and the chemical resistance was visually identified after immersing ½ of a sample in a 5% NaOH solution for 23 hours. In this regard, there should be no discoloration and no swelling.

Processability was measured by a 180° bending test by using a vise or a bending tester, and bending Test was performed at an inner interval of a specimen thickness of IT. A case in which no cracks, breaks, or bursts were found on a bent surface was marked by O, and a case in which cracks, breaks, or bursts were found was marked by X.

TABLE 3

|  | Example 1 | Comparative Example 1 | Comparative Example 2 | Comparative Example 3 | Comparative Example 4 | Comparative Example 5 | Comparative Example 6 |
| --- | --- | --- | --- | --- | --- | --- | --- |
| Surface discoloration | O | O | O | X | O | X | O |
| Processability | O | X | X | O | O | O | O |

Figure 12:
FIG. 12 is a photograph of a matting agent-free matte metallic steel sheet for a home appliance according to an embodiment.

FIG. 12 is a photograph of a matting agent-free matte metallic steel sheet for a home appliance according to an embodiment. Referring to FIG. 12, in the case where the clearcoat layer included the acrylic resin having a weight average molecular weight of 70,000 to 100,000, was formed as a thin film having a thickness of 2.5 μm to 4.0 μm, and had a solid content of 10% to 25%, excellent processability as well as superior chemical resistance was confirmed. On the contrary, it was confirmed that surface discoloration occurred and inferior processability was obtained in Comparative Examples 1 to 3 and 5 because the resin type, the weight average molecular weight, and the thickness of the coated film did not satisfy the conditions provided herein.

<Measurement According to Colorimetric L-Value>

Table 4 below shows changes in brightness and corrosion resistance evaluation results according to colorimetric L-values of black primers.

First, samples including black primers with different colorimetric L-values were prepared. The steel sheet, basecoat layer, print layer, and clearcoat layer of the samples were the same. For example, the steel sheet was an electrolytic galvanized iron steel sheet, the basecoat layer included a metallic pigment having a major axis of 16 μm, the basecoat layer included a solvent with a boiling point of 200° C., the hairline layer included an acrylic resin having a molecular weight of 80,000, and the clearcoat layer included an acrylic resin.

Brightness was measured at room temperature using an X-Rite MA68+ and digitized by flop index using light reflectance of a metallic pigment at different angles. Reflectance of the metallic pigment was measured at angles 15°, 45°, and 115°.

Brightness expressed as a numerical value of flop index has no unit.

Corrosion resistance was measured by forming an X-shaped groove with one side of 2 mm on the surface of each sample and adding the sample to a corrosion resistance evaluating chamber. The chamber was set to provide an environment having a NaCl concentration of 5%, a temperature of 35° C.±2° C. and a humidity of 90%±5%.

As a result of evaluating corrosion resistance, a case in which no swelling, exfoliation, and corrosion exceeding 2 mm occurred in the X-shaped groove was marked by 'O', and a case in which at least one of swelling, exfoliation, and corrosion exceeding 2 mm occurred in the X-shaped groove was marked 'X'.

TABLE 4

| Category | Colorimetric L-value | | | | | | | | | |
|---|---|---|---|---|---|---|---|---|---|---|
| | 80 | 70 | 50 | 45 | 40 | 35 | 30 | 25 | 20 | 15 |
| Brightness | 11.01 | 12.52 | 15.74 | 18.49 | 18.52 | 18.93 | 23.38 | 25.40 | 25.43 | 25.78 |
| Corrosion resistance | O | O | O | O | O | O | O | O | O | X |

Referring to Table 4, when the colorimetric L-value was 30 or more, the samples satisfied the brightness of 20 or more. However, when the L-value of the colorimetric L-value was 20 or less, the samples did not satisfy the corrosion resistance. That is, in the case of using the black primer having a colorimetric L-value of 20 to 30, both desired high brightness and corrosion resistance were satisfied.

<Evaluation of Exterior Appearance>

In Table 5 below, changes in brightness and evaluation results on exterior appearance according to the length of the major axis of the metallic pigment are shown.

In this case, length of the major axis of the metallic pigment was expressed as an average. The average refers to a median length (D50) in a distribution chart in which particles are accumulated in the order of particle diameter from the smallest particle to the largest particle.

First, samples having different major axes of metallic pigments were prepared. Steel sheets, primer layers, boiling points of solvents of basecoat layers, print layers, and clearcoat layers of the samples were the same. For example, the steel sheet was an EGI steel sheet, a colorimetric L-value of the primer layer was 25, the basecoat layer included a solvent having a boiling point of 200° C., the hairline layer included an acrylic resin having a molecular weight of 80,000, and the clearcoat layer included an acrylic resin.

Brightness was measured at room temperature using an X-Rite MA68± and digitized by flop index using light reflectance of a metallic pigment at different angles. Reflectance of the metallic pigment was measured at angles 15°, 45°, and 115°.

Brightness expressed as a numerical value of flop index has no unit.

Evaluation was performed on the exterior appearances by marking a case in which scratches occurred on the surface of the matting agent-free matte metallic steel sheet for a home appliance by 'X', and marking a case in which scratches did not occur by 'O'. In this regard, scratches with a depth greater than 50 mm were counted.

TABLE 5

| Category | Length of major axis of metallic pigment (μm) | | | | | | | |
|---|---|---|---|---|---|---|---|---|
| | 7 | 10 | 14 | 17 | 19 | 22 | 27 | 30 |
| Brightness | 17 | 19 | 23 | 24 | 24 | 25 | 26 | 28 |
| Appearance | O | O | O | O | X | X | X | X |

Referring to Table 5, it was confirmed that higher brightness was obtained at a longer major axis of the metallic pigment. However, at a too long major axis of the metallic pigment, scratches occur due to protrusions on the surface, resulting in marring of the exterior appearance. Therefore, it was confirmed that the major axis of the metallic pigment should be appropriately controlled to obtain high brightness simultaneously satisfying desirable quality of the exterior appearance.

Table 6 below shows changes in brightness according to boiling points of the solvent of the basecoat layer.

First, samples were prepared to have different boiling points of the solvents of the basecoat layers. Steel sheets, primer layers, lengths of major axes of metallic pigments of basecoat layers, print layers, and clearcoat layers of the samples were the same. For example, the steel sheet was an EGI steel sheet, and a colorimetric L-value of the primer layer was 25, a metallic pigment with a major axis of 16 μm was used in the basecoat layer, the hairline layer included an acrylic resin having a molecular weight of 80,000, and the clearcoat layer included an acrylic resin.

Brightness was measured at room temperature using an X-Rite MA68± and digitized by flop index using light reflectance of a metallic pigment at different angles. Reflectance of the metallic pigment was measured at angles 15°, 45°, and 115°.

Brightness expressed as a numerical value of flop index has no unit.

TABLE 6

| Category | Boiling point of solvent of basecoat layer (° C.) | | | | | | | |
|---|---|---|---|---|---|---|---|---|
| | 150 | 160 | 170 | 180 | 190 | 200 | 210 | 220 |
| Brightness | 18.4 | 20.6 | 22.7 | 23.8 | 24.2 | 24.1 | 23.9 | 21.8 |

Referring to Table 6, it was confirmed that brightness was higher at a higher boiling point of the solvent of the basecoat layer. However, at a too high boiling point of the solvent of the basecoat layer, brightness decreased because the solvent contained inside could not evaporate even after the surface of the basecoat layer was cured. Therefore, high brightness property may be obtained by using a solvent with a boiling point of 160° C. to 220° C.

According to the present disclosure, a matting agent-free matte metallic steel sheet 2 for a home appliance includes a steel sheet 20; a primer layer 21 formed on the steel sheet 20; a basecoat layer 22 formed on the primer layer 21: a print layer 23 formed on the basecoat layer 22; and a clearcoat layer 24 formed on the print layer 23, wherein the clearcoat layer includes an acrylic resin having a weight average molecular weight Mw of 70,000 to 100,000.

In the matting agent-free matte metallic steel sheet 2 for a home appliance, the clearcoat layer 24 may have a thickness of 2.5 μm to 4.0 μm.

In the matting agent-free matte metallic steel sheet 2 for a home appliance, the clearcoat layer 24 may have a solid content (NV) of 10% to 25%.

In the matting agent-free matte metallic steel sheet 2 for a home appliance, the steel sheet 20 may be an electrolytic galvanized iron (EGI) steel sheet or a galvanized iron (GI) steel sheet.

In the matting agent-free matte metallic steel sheet 2 for a home appliance, the basecoat layer 22 may include an acrylic resin or polyester.

In the matting agent-free matte metallic steel sheet 2 for a home appliance, the basecoat layer 22 may include a metallic pigment or sparkles.

In the matting agent-free matte metallic steel sheet 2 for a home appliance, the basecoat layer 22 may include a solvent having a boiling point of 160° C. to 220° C.

In the matting agent-free matte metallic steel sheet 2 for a home appliance, the print layer 23 may be a hairline layer or a pattern layer.

In the matting agent-free matte metallic steel sheet 2 for a home appliance, the hairline layer may include an acrylic resin having a molecular weight Mw of 70,000 to 90,000.

In the matting agent-free matte metallic steel sheet 2 for a home appliance, the primer layer 21 may include a black primer having a colorimetric L-value of 20 to 30.

The matting agent-free matte metallic steel sheet 2 for a home appliance may have a brightness reduction rate of 5% or less.

According to the present disclosure, a refrigerator 100 may include a main body 110, a storage compartment provided inside the main body 110, and a door 130 coupled to the main body 110 to open and close at least one portion of the storage compartment, wherein the door 130 includes a matting agent-free matte metallic steel sheet 2 for a home appliance. The matting agent-free matte metallic steel sheet 2 may include a steel sheet 20, a primer layer 21 formed on the steel sheet 20, a basecoat layer 22 formed on the primer layer 21, a print layer 23 formed on the basecoat layer 22, and a clearcoat layer 24 formed on the print layer 23, wherein the clearcoat layer 24 includes an acrylic resin with a weight average molecular weight Mw of 70,000 to 100,000.

In the refrigerator 100, the clearcoat layer 24 of the matting agent-free matte metallic steel sheet 2 may have a thickness of 2.5 μm to 4.0 μm.

In the refrigerator 100, the clearcoat layer 24 of the matting agent-free matte metallic steel sheet 2 may have a solid content (NV) of 10% to 25%.

In the refrigerator 100, the basecoat layer 22 of the matting agent-free matte metallic steel sheet 2 may include an acrylic resin or polyester.

In the refrigerator 100, the basecoat layer 22 of the matting agent-free matte metallic steel sheet 2 may include a metallic pigment or sparkles.

In the refrigerator 100, the basecoat layer 22 of the matting agent-free matte metallic steel sheet 2 may include a solvent having a boiling point of 160° C. to 220° C.

In the refrigerator 100, the print layer 23 of the matting agent-free matte metallic steel sheet 2 may be a hairline layer or a pattern layer.

In the refrigerator 100, the primer layer 21 of the matting agent-free matte metallic steel sheet 2 may include a black primer having a colorimetric L-value of 20 to 30.

In the refrigerator 100, the matting agent-free matte metallic steel sheet 2 may have a brightness reduction rate of 5% or less.

What is claimed is:

1. A matting agent-free matte metallic steel sheet for a home appliance comprising:
   a steel sheet;
   a primer layer formed on the steel sheet;
   a basecoat layer formed on the primer layer;
   a print layer formed on the basecoat layer; and
   a clearcoat layer formed on the print layer,
   wherein the clearcoat layer comprises an acrylic resin having a weight average molecular weight (Mw) range of 70,000 to 100,000,
   wherein the matting agent-free matte metallic steel sheet has a gloss measurement at 60° in a range of 72 to 75, and
   wherein the matting agent-free matte metallic steel sheet has a brightness reduction rate that is less than or equal to 5% while maintaining light transmission and reflection from the basecoat layer.

2. The matting agent-free matte metallic steel sheet according to claim 1, wherein the clearcoat layer has a thickness range of 2.5 μm to 4.0 μm.

3. The matting agent-free matte metallic steel sheet according to claim 1, wherein the clearcoat layer has a solid content (NV) range of 10% to 25%.

4. The matting agent-free matte metallic steel sheet according to claim 1, wherein the steel sheet is an electrolytic galvanized iron (EGI) steel sheet or a galvanized iron (GI) steel sheet.

5. The matting agent-free matte metallic steel sheet according to claim 1, wherein the basecoat layer comprises an acrylic resin or polyester.

6. The matting agent-free matte metallic steel sheet according to claim 1, wherein the basecoat layer comprises a metallic pigment or sparkles.

7. The matting agent-free matte metallic steel sheet according to claim 1, wherein the basecoat layer comprises a solvent having a boiling point range of 160° C. to 220° C.

8. The matting agent-free matte metallic steel sheet according to claim 1, wherein the print layer comprises surface texturing including a hairline layer or a pattern layer.

9. The matting agent-free matte metallic steel sheet according to claim 8, wherein the print layer comprises an acrylic resin having a molecular weight (Mw) range of 70,000 to 90,000.

10. The matting agent-free matte metallic steel sheet according to claim 1, wherein the primer layer comprises a black primer having a colorimetric L-value range of 20 to 30.

11. A refrigerator comprising:
    a main body;
    a storage compartment provided in the main body; and
    a door coupled to the main body to open or close at least one portion of the storage compartment,
    wherein the door comprises a matting agent-free matte metallic steel sheet, the matting agent-free matte metallic steel sheet comprising:

a steel sheet;
a primer layer formed on the steel sheet;
a basecoat layer formed on the primer layer;
a print layer formed on the basecoat layer; and
a clearcoat layer formed on the print layer,
wherein the clearcoat layer comprises an acrylic resin having a weight average molecular weight (Mw) range of 70,000 to 100,000,
wherein the matting agent-free matte metallic steel sheet has a gloss measurement at 60° in a range of 72 to 75, and
wherein the matting agent-free matte metallic steel sheet has a brightness reduction rate that is less than or equal to 5% while maintaining light transmission and reflection from the basecoat layer.

12. The refrigerator according to claim 11, wherein the clearcoat layer of the matting agent-free matte metallic steel sheet has a thickness range of 2.5 μm to 4.0 μm.

13. The refrigerator according to claim 11, wherein the clearcoat layer of the matting agent-free matte metallic steel sheet has a solid content (NV) range of 10% to 25%.

14. The refrigerator according to claim 11, wherein the basecoat layer of the matting agent-free matte metallic steel sheet comprises an acrylic resin or polyester.

* * * * *